US012165394B2

(12) United States Patent
Ferroni

(10) Patent No.: US 12,165,394 B2
(45) Date of Patent: Dec. 10, 2024

(54) METHOD AND PROCESSING UNIT FOR PROCESSING SENSOR DATA OF SEVERAL DIFFERENT SENSORS WITH AN ARTIFICIAL NEURAL NETWORK IN A VEHICLE

(71) Applicant: FORD GLOBAL TECHNOLOGIES, LLC, Dearborn, MI (US)

(72) Inventor: Francesco Ferroni, Bayern (DE)

(73) Assignee: Ford Global Technologies, LLC, Dearborn, MI (US)

( * ) Notice: Subject to any disclaimer, the term of this patent is extended or adjusted under 35 U.S.C. 154(b) by 344 days.

(21) Appl. No.: 17/811,176

(22) Filed: Jul. 7, 2022

(65) Prior Publication Data

US 2023/0009766 A1  Jan. 12, 2023

(30) Foreign Application Priority Data

Jul. 8, 2021  (EP) ..................................... 21184566

(51) Int. Cl.
*G06V 10/80* (2022.01)
*G06V 10/82* (2022.01)
*G06V 20/58* (2022.01)

(52) U.S. Cl.
CPC ............ *G06V 10/803* (2022.01); *G06V 10/82* (2022.01); *G06V 20/58* (2022.01)

(58) Field of Classification Search
CPC ...... G06V 10/803; G06V 10/82; G06V 20/58; G06V 10/454; G06V 10/764; G06V 20/64; G06V 20/56; G06V 10/16; G06V 10/25; G06V 10/26; G06F 18/251; G06N 3/045; G06N 3/08; G06N 3/04; G06N 3/084;

(Continued)

(56) References Cited

U.S. PATENT DOCUMENTS 10,504,027 B1 * 12/2019 Kim ........................ G06N 3/045
10,579,924 B1 *  3/2020 Kim ........................ G06N 5/046

(Continued)

OTHER PUBLICATIONS

Rangesh Akshay et al: "No Blind Spots: Full-Surround Multi-Object Tracking for Autonomous Vehicles Using Cameras and LiDARs", IEEE Transactions On Intelligent Vehicles, vol. 4, No. 4, Dec. 2019, pp. 588-599.

*Primary Examiner* — Michael S Osinski
(74) *Attorney, Agent, or Firm* — Frank A. MacKenzie; Brooks Kushman P.C.

(57) ABSTRACT

A method for operating a processing unit of a vehicle for processing sensor data of several different sensors with an artificial neural network, wherein a set of volume data cells is provided as a volumetric representation of different volume elements of an environment, and when sensor data is generated by the sensors the sensor data is transferred to the respective volume data cells using an inverse mapping function, wherein each inverse mapping function is a mapping of a respective sensor coordinate system of the sensor to an internal volumetric coordinate system corresponding to the world coordinate system, and by the transfer of the sensor data each volume data cell receives the sensor data that are associated with this volume data cell according to the inverse mapping function from each sensor, wherein the received sensor data from each sensor are accumulated in the respective volume data cell as combined data.

20 Claims, 5 Drawing Sheets

(58) Field of Classification Search
CPC ........ G06N 3/0464; G06N 3/048; G06N 3/09;
G06N 3/02; G06T 2207/20081; G06T
2207/20084; G06T 2207/10028; G06T
2207/10016; G06T 7/75; G06T
2207/30196; G06T 2207/30252; G06T
2207/30261; G06T 7/70; G06T 7/74
See application file for complete search history.

(56) References Cited

U.S. PATENT DOCUMENTS

| | | | | |
|---|---|---|---|---|
| 10,650,279 | B1* | 5/2020 | Kim | G06N 3/08 |
| 10,867,190 | B1* | 12/2020 | Vajna | G06V 10/776 |
| 10,922,557 | B2* | 2/2021 | Schlicht | H04L 12/40 |
| 11,436,743 | B2* | 9/2022 | Guizilini | G06T 7/521 |
| 11,482,014 | B2* | 10/2022 | Kehl | G01S 13/867 |
| 11,887,336 | B2* | 1/2024 | Ferroni | G06V 20/64 |
| 11,982,534 | B2* | 5/2024 | Garcia | G01C 21/3859 |
| 2010/0272366 | A1* | 10/2010 | Meng | G06V 30/2504 382/190 |
| 2016/0358035 | A1* | 12/2016 | Ruan | G06F 18/2415 |
| 2017/0262727 | A1* | 9/2017 | Kozuka | G06F 18/2155 |
| 2019/0176702 | A1* | 6/2019 | Shidochi | B60R 1/26 |
| 2019/0228236 | A1* | 7/2019 | Schlicht | G06V 20/588 |
| 2019/0303684 | A1* | 10/2019 | Khadloya | G07C 9/00896 |
| 2020/0025873 | A1* | 1/2020 | Kubertschak | G01S 17/931 |
| 2020/0068184 | A1* | 2/2020 | Shadik | H04N 13/128 |
| 2020/0097739 | A1* | 3/2020 | Hashimoto | B60W 30/0956 |
| 2020/0218941 | A1* | 7/2020 | Wang | G06F 30/20 |
| 2021/0073584 | A1* | 3/2021 | St. Romain, II | G06N 5/04 |
| 2021/0133466 | A1* | 5/2021 | Gier | G05D 1/0223 |
| 2021/0148719 | A1* | 5/2021 | Xu | G01C 21/3602 |
| 2021/0304524 | A1* | 9/2021 | McGill | G07C 5/008 |
| 2022/0083077 | A1* | 3/2022 | Pereira Da Silva | G06F 18/253 |
| 2022/0219716 | A1* | 7/2022 | McAlister | B60W 50/14 |
| 2022/0292289 | A1* | 9/2022 | Shalumov | G06F 18/214 |
| 2022/0357441 | A1* | 11/2022 | Ansari | G06N 20/00 |
| 2022/0375126 | A1* | 11/2022 | Huelsdunk | G06T 7/77 |
| 2023/0032888 | A1* | 2/2023 | Li | G06F 18/22 |
| 2023/0075493 | A1* | 3/2023 | Kabkab | G06V 20/582 |
| 2023/0102322 | A1* | 3/2023 | Wang | G06V 20/50 382/103 |
| 2023/0109473 | A1* | 4/2023 | Han | H04N 23/90 348/135 |
| 2023/0112456 | A1* | 4/2023 | Araújo | H04W 4/44 382/103 |
| 2023/0118864 | A1* | 4/2023 | Zhang | G06V 20/30 382/103 |
| 2023/0252677 | A1* | 8/2023 | Cao | G06T 7/73 382/104 |
| 2023/0289980 | A1* | 9/2023 | Yamamoto | G06V 20/58 |
| 2023/0326078 | A1* | 10/2023 | Lee | G06T 15/205 382/114 |
| 2024/0029303 | A1* | 1/2024 | Su | G06N 3/0464 |

* cited by examiner

METHOD AND PROCESSING UNIT FOR PROCESSING SENSOR DATA OF SEVERAL DIFFERENT SENSORS WITH AN ARTIFICIAL NEURAL NETWORK IN A VEHICLE

RELATED APPLICATIONS AND CLAIM OF PRIORITY

This patent application claims priority to European Patent Application Number 21184566.4, filed Jul. 8, 2021. The disclosure of the priority application is fully incorporated into this document by reference.

TECHNICAL FIELD

The invention is concerned with the implementation of a sensor data fusion for processing combined data of several different sensors using an artificial neural network. The processing may comprise an object recognition. The invention provides a method and processing unit for processing the sensor data of several different sensors. The invention may be used as a pre-processing for an autonomous driving function in a motor vehicle.

BACKGROUND

In the field of object recognition, sensor data fusion for object recognition is a technique for recognizing an object on the basis of the sensor data of several different sensors. This provides the advantage that each sensor may sense different signals or characteristics of the object such that the recognition may be based on a broader basis of input information. For example, for detecting a person in an environment, a camera for capturing visible light and a sensor for sensing infrared radiation may both provide sensor data. Recognizing the person is more robust or reliable as both the visual appearance (camera data) as well as the heat emitted from the body of the person (infrared data) may be used to verify that the object actually is a person or human being.

Generally, two ways of fusing the sensor data are known. One solution is to perform an individual object recognition on the respective sensor data of each sensor individually. Then, these separate recognition results for the different sensors may be combined in order to verify the different recognition results against each other.

The alternative solution is to perform a combined object recognition on the basis of a mixture or combination of the sensor data from the different sensors. This second solution may be difficult to implement as prior to any object recognition it is difficult to decide which sensor data from one sensor should be combined with which other sensor data from another sensor. No intermediate recognition result is available that may indicate which data may belong together.

SUMMARY

This document describes methods and systems to provide a sensor data fusion for a data processing that is based on an artificial neural network (":ANN"), in particular for an ANN-based object recognition, in a vehicle.

The objective is accomplished by the subject matter of the independent claims. Advantageous developments with convenient and non-trivial further embodiments are specified in the following description, the dependent claims and the figures.

As one solution, a method is provided for operating a processing unit of a vehicle in order to process sensor data of several different sensors with an artificial neural network, ANN. A respective detection range of each sensor is directed towards an environment of the vehicle. Preferably, the detection ranges of the different sensors overlap fully or partly. The method is characterized in that a set of specific data structures, namely "volume data cells", is provided as a volumetric representation of different volume elements or voxels of the environment. In other words, a "volume data cell" is a data structure for storing data belonging to the same volume element of the environment. A volume element, as represented by a volume data cell, can be defined, e.g., as a cube or a cuboid with an edge length in the range from, e.g., 10 cm to 2 m. The volume data cells may be provided in a memory of the processing unit. In a preferred embodiment, the volume data cells are provided by at least one layer of said artificial neural network itself.

The solution is based on the fact that for each combination of one of the (real) volume elements of the environment and one of the sensors a respective mapping of a world coordinate system of the environment to a respective sensor coordinate system of the respective sensor is given. The mapping describes the path of the detected signal or radiation (e.g. visible light or radar or infrared light or ultrasonic sound) from the respective volume element to the sensor or the sensor chip of the sensor.

When sensor data is generated by the sensor, this sensor data is transferred to the respective volume data cells using an inverse mapping function, which provides an inverse mapping to said mapping, such that each inverse mapping function is a mapping of the respective sensor coordinate system to an internal volumetric coordinate system that corresponds to the world coordinate system. The inverse mapping function identifies in which one of the volume data cells specific sensor data are to be stored. This identifies the volume data cell to which the sensor data belong, i.e. the volume data cell that represents the volume element from which the signal or radiation must have originated. For example, in a camera sensor with a sensor chip for detecting pixels, a specific region or set of pixels on that chip will hold the picture of a specific volume element depending on, e.g., the design of the optical lens of the camera. For example the top left corner of the sensor chip may hold all those pixels that original from the volume element that is on the bottom right as seen from the camera (as the optical lens may provide a flipped image). The mapping and consequently the inverse mapping function can be derived from geometric calculations and/or on the basis of a training of parts of the artificial neural network. Note that the inverse mapping function can also be ambiguous, as, e.g., from a 2-dimensional sensor coordinate system (as it is given in a sensor chip of a camera) it cannot be decided from which volume element the light exactly came from as the depth information is lost. In this case, the corresponding sensor data may be stored in several volume data cells.

By the transfer of the sensor data from all sensors to the volume data cells, each volume data cell receives the sensor data of each sensor and thus the received sensor data from the different sensors are collected or accumulated (i.e. stored together or are made available together) in the respective volume data cell as accumulated or fused or combined data. Thus, each volume data cell holds the combined object information as captured by the different sensors.

For each volume data cell an individual processing of the combined data of that volume data cell is performed by the artificial neural network wherein the individual processing comprises deriving feature data of at least one feature of at least one object that is described by the combined data in that volume data cell such that a combined processing of sensor data of the different sensors for the same volumetric element is performed. Thus, for the processing of the sensor data, the artificial neural network is already provided with a mixture or accumulation of sensor data (i.e. the combined data) from different sensors. Preferable, the sensor data are kept separate in the combined data (e.g. no mean value of the sensor data is calculated to obtain the combined data).

This provides the benefit that for recognizing objects the different aspects or characteristics (for example sensor data describing visible light and infrared light) are already available in combination for the processing. The processing is an "individual processing" as it may be performed separately for each volume data cell.

The invention also comprises further developments with additional technical features that provide further benefits.

One further development comprises that at least a part of the processing of the sensor data from the volume data cells is "agnostic" in that it is performed independently from which sensor the sensor data or the combined data are from. In other words, the sensor data may indicate or describe a measurement value, for example an intensity and/or a position, for single data points, but to agnostic processing of sensor data it is unknown, which sensor performed the actual measurement, in particular which type of sensor (e.g. camera or radar) did the measurement. This provides the advantage that sensor data from different sensors can be processed in the same processing step as no differentiation or distinction is made between their sensor data. Agnostic processing can be advantageous, for example, for edge detection and/or a detection of a contour of an object.

One further development comprises that at least for a part of the processing of the sensor data respective tagging data is provided, wherein the tagging data informs or signals to the ANN from which sensor the respective sensor data in the combined data is coming from. In other words, for a single respective single data point or measurement it is denoted or signaled, which sensor performed the actual measurement that yielded the sensor data. The tagging data can be provided, for example, as a flag indicating which sensor the sensor data are from, or as a value of a variable indicating the sensor or its sensor type. Providing sensor data together with tagging data provides the advantage that the processing based on the ANN can be adapted to specific characteristics of the respective sensor. For example, a sensor-specific distortion and/or characteristic curve, for example a color mapping, can be compensated and/or can be taken into account for processing and/or interpreting the sensor data.

One further development comprises that for the processing of at least one volume data cell the ANN also receives at least a part of the combined data from at least one neighboring volume data cell. In other words, the processing is not only based on the combined data contained in the one volume data cell associated with the respective volume element of the environment, but also sensor data from at least one neighboring volume element are considered. This provides the advantage that the influence of neighboring volume elements and/or the context as given by neighboring volume data cells can be considered in the processing of the combined data of a respective volume data cell. For example, it can be verified, if an object that has been recognized in a specific volume element also extends into the neighboring volume element.

One further development comprises that a 3D-convolution is applied to combine at least a part of the sensor data of at least two neighboring volume data cells for generating at least a part of the combined data of these volume data cells. In other words, new data are generated by combining sensor data using a convolution operation. This has been proven to be a beneficial pre-processing for some types of sensor data. For example, a smoothing over several volume elements can be provided, which can combine separate signals that originate from the same object, for example reflections of radar radiation from different parts of the same vehicle. By applying a 3D-convolution, these signals can be smeared in order to make them appear as coming from one object, e.g. a vehicle. The operation does not need to necessarily be a 3D convolution. For example, if the voxel space is sparse, one could use a sparse convolution implementation. In general, a mathematical operation that fuses or combines spatially proximate or neighboring values.

One further development comprises that in at least one iteration step at least one invariant operator is applied to the resulting feature data for deriving modified feature data. Another expression for "invariant operator" also is invariant differential operator. An invariant differential operator is one kind of mathematical map of a function to a function of changed or different type, but with the same basic characteristics of the function, e.g. monotonicity. Applying an invariant operator can help scaling and/or emphasizing pre-defined characteristics of an object for the recognition process. One example is a gamma correction curve.

One further development comprises that the respective inverse mapping function models sensor intrinsics (intrinsic parameters) and sensor extrinsics (extrinsic parameters) of the respective sensor. Intrinsic parameters are, for example, the focal length, the image sensor format and the focal point. Extrinsic parameters are, for example, the position, main axis and rotational position of the camera on this main axis. By considering at least one of or several of these parameters, an image distortion can be compensated such that a correct association of a volume element to a volume data cell is achieved.

One further development comprises that the inverse mapping functions for the different volume data cells are implemented as an artificial neural network. In other words, the artificial neural network for processing the combined data can be preceded in the processing chain or signal chain by an artificial neural network that maps the sensor data to the respective volume data cells. This can be provided as a separate artificial neural network or, alternatively, as specific layers of the artificial neural network that is also trained for the processing of the resulting combined data. In other words, one further development comprises that the volume data cells are provided by one or more than one layer of the ANN, wherein the ANN preferably comprises both the inverse mapping functions and the individual processing for the volume data cells. For implementing the inverse mapping functions, the artificial neural network can be trained for providing the inverse mapping function. For example, sensor training data may be provided together with labeling data that indicate to which volume data cell the sensor data belong to. The sensor training data and the corresponding labeling data may be generated on the basis of test drives and/or numerical simulations of the signal processing inside the sensors and/or on the basis of the extrinsics and intrinsics of the respective sensor.

As a further solution a processing unit for a vehicle is provided that is designed to perform an embodiment of the described method. The processing unit may comprise a data processing device or a processor circuit adapted to perform an embodiment of the method according to the invention.

For this purpose, the processor circuit may comprise at least one microprocessor and/or at least one microcontroller and/or at least one FPGA (field programmable gate array) and/or at least one DSP (digital signal processor). Furthermore, the processor circuit or a device that is in communication with the processor circuit may include a non-transitory memory that stores program code which comprises computer-readable instructions to perform the embodiment of the method according to the invention when executed by the processor device. The program code may be stored in a data memory of the processor device.

As a further solution a motor vehicle is provided. The motor vehicle comprises an electronic control circuit that is designed to operate the vehicle in an autonomous driving mode. The motor vehicle also comprises several sensors for detecting objects in the environment of the vehicle. The control circuit is coupled to the sensors over an embodiment of said processing unit. The motor vehicle can be designed as a passenger vehicle or a truck.

The invention also comprises the combinations of the features of the different developments.

BRIEF DESCRIPTION OF THE DRAWINGS

In the following, exemplary implementations of the invention are described. The figures show.

The embodiments explained in the following is a preferred embodiment of the invention. However, in the embodiments, the described components of the embodiment each represent individual features of the invention which are to be considered independently of each other and which each develop the invention also independently of each other and thereby are also to be regarded as a component of the invention in individual manner or in another than the shown combination. Furthermore, the described embodiments can also be supplemented by further features of the invention already described.

In the figures identical reference signs indicate elements that provide the same function.

In the following, the principle of the sensor data fusion is explained on the basis of an example that is illustrated in FIG. 1 to FIG. 4.

DETAILED DESCRIPTION

Figure 1:
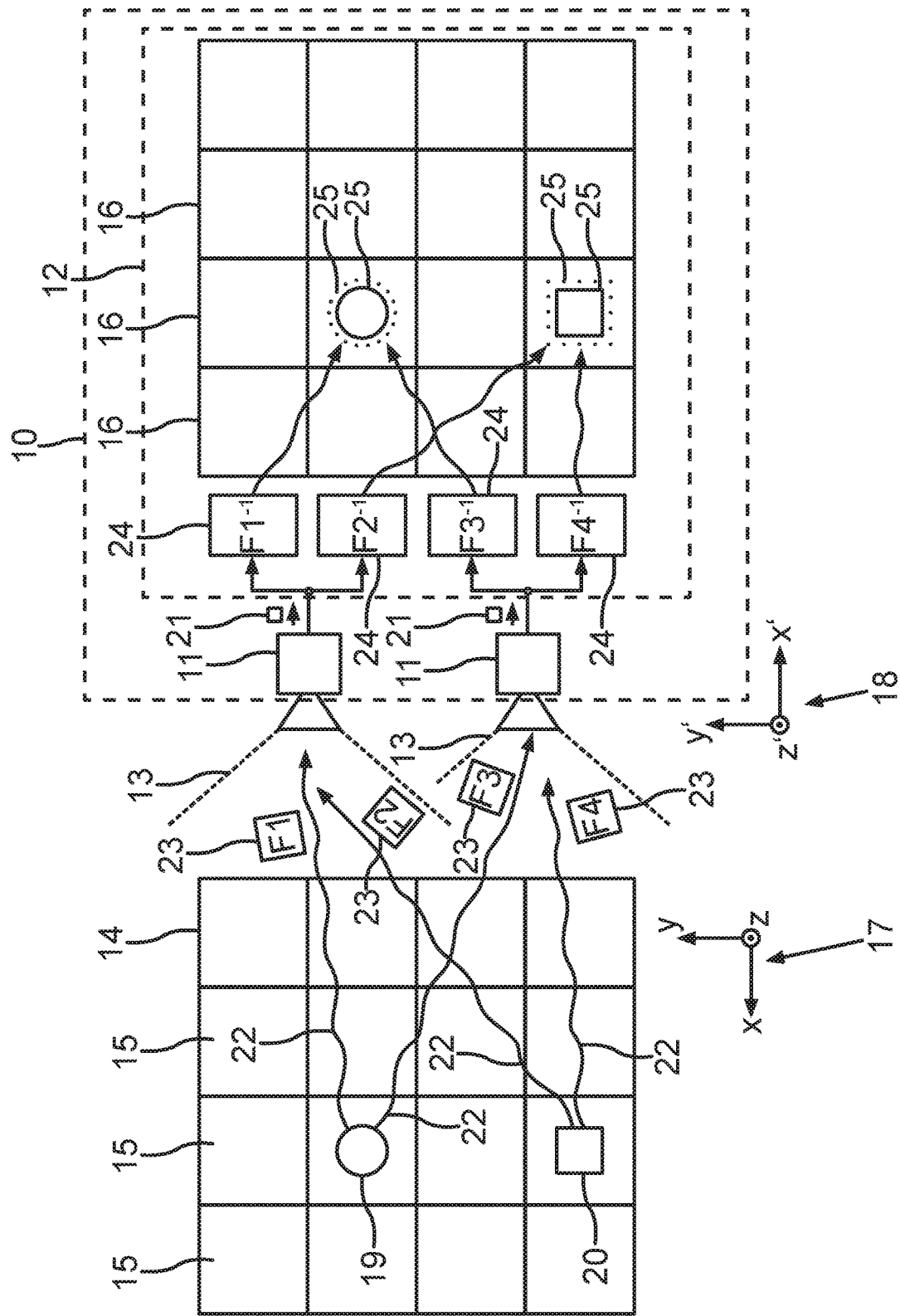
FIG. 1 is a sketch that is illustrating the mapping of a world coordinate system of an environment of a vehicle to a respective sensor coordinate systems of respective sensors of the vehicle.

FIG. 1 shows a vehicle 10 with sensors 11 and a processing unit 12. The processing unit 12 can be, e.g., a central computer of the vehicle 10. Detection ranges 13 of the sensors 11 may be directed towards the environment 14 of the vehicle 10 such that they observe or cover surroundings of the vehicle 10. Different regions in the environment 14 can be regarded as volume elements 15, but this only a virtual classification. As FIG. 1 shows a top view, the volume elements 15 are depicted as flat regions (as height is not illustrated). Each volume element 15 can be associated with a respective volume data cell 16 inside the processing unit 12 such that the volume data cells 16 constitute a volumetric representation of the environment 14. Each volume data cell 16 can be a predefined section of a data memory of the processing unit 12.

In each volume data cell 16, information can be stored, the information regarding possible objects that might exist or might be present in the corresponding volume element 15 of the environment 14. A world coordinate system 17 of the environment 14 and an internal volumetric coordinate system 18 of the volumetric representation illustrate how a correspondence between a virtual volume element 15 and a volume data cell 16 can be established in that a point X, Y, Z in the environment 14 (world coordinate system 17) corresponds to a data set containing coordinates X', Y', Z' (internal volumetric coordinate system 18) that may be stored in the corresponding volume data cell 16 together with further information about the point X, Y, Z (e.g. color and/or brightness). Note that in FIG. 1 only a few volume elements 15 and volume data cells 16 are labeled with a reference sign in order to keep FIG. 1 readable.

For detecting objects 19, 20 in the environment 14, the several sensors 11 can generate sensor data 21 that are correlated with radiation or signals 22 that are emitted by the objects 19, 20. The signals 22 can be, for example, light beams or reflected radar waves or ultrasonic waves, respectively. Correspondingly, the sensors 11 can be, for example, a camera or a radar detector or an ultrasonic transducer, respectively. Other possible sensor types are, for example, a LIDAR and an infrared sensor. Preferably, the sensors 11 are of different sensor types or sensing technology (e.g. radar and light).

It is now necessary to know which incoming sensor data 21 belong to which volume data cell 16. This is accomplished on the basis of the following principle.

The path of a signal 22 from the respective object 19 to one of the sensors 11 and/or the processing of that signal 22 inside the sensor 11 for generating corresponding sensor data 21 can be described by a respective mapping 23 (mapping from origin of the signal 22 to the resulting values in the sensor data 21, e.g. a resulting value of an image pixel). For distinguishing between the different mappings, FIG. 1 shows mapping functions F1, F2, F3, F4 as examples of possible mappings 23. For each pair of a volume element 15 and a sensor 11, a corresponding mapping 23 can be defined that describes which sensor data 21 would result, if a signal 22 from that volume element 15 was received by that sensor 11. Each mapping 23 can describe the influence or transformation effect on a signal 22 on its way from the respective volume element 15 to the respective sensor 11 and/or the signal processing characteristics of the sensor 11 when generating the sensor data 21, like, for example, a distortion in a lens of a sensor 11 and/or the signal damping in an electric circuit of a sensor 11 can be modelled by such a mapping function that describes the mapping 23. Overall, the mapping function of a specific mapping 23 describes how the coordinates of a respective point X, Y, Z in the environment 14 expressed by the world coordinate system 17 is mapped to a point in a sensor coordinate system. For example, in the case of a 2-dimensional image sensor with pixels in a 2-dimensional U-V-image-plane (U, V are the coordinates in the image plane resulting in a 2-dimensional sensor coordinate system), the signal 22 (e.g. light) from a point X, Y, Z in the environment 14 will be mapped to a pixel U, V in the sensor image plane (or to several pixels, if an effect like diffusion and/or chromatic aberration is also modelled by the mapping function for mapping 23).

In other words, the signals 22 (e.g. light or radar waves) of the real world environment 14 coming from the volume elements 15 are projected to the sensors 11 which results in a mapping from world coordinate system 17 into a respective sensor coordinate system of the respective sensor 11. A sensor coordinate system can be 2-dimensional or 3-dimensional or 4-dimensional or even so-called 2.5-dimensional (which refers to a reduced spatial resolution in a third dimension).

If sensor data 21 are generated by the sensors 11, these sensor data 21 must then be transferred or mapped to the correct volume data cell 16 that represents the volume element 15 where the signal 22 that is described by these sensor data 21 possibly came from. It is worth noticing that this association is not necessarily unambiguous. For example, sensor data 21 from a 2-dimensional image sensor 11 lack depth information (i.e. a third dimension) such that a distance of an object 19, 20 is not described by the sensor data 21 of such a 2-dimensional image sensor. The sensor data 21 of a specific pixel of that image sensor 11 might therefore result from any one volume element 15 that lies along a straight line of propagation described by the beam of that signal 22.

For mapping the sensor data 21 to one or (in the case of ambiguity) to more than one volume data cell 16, use can be made of the knowledge about the mapping functions 23. By inverting such a mapping function 23, a respective inverse mapping can be generated that indicates which sensor data 21 belong to which volume data cell 16 by describing the back projection from a respective point in the respective sensor coordinate system back into the environment 14 and thus also into the volumetric representations given by the volume data cells 16 (i.e. into the (internal volumetric coordinate system 18).

If 2-D camera image data (i.e. pixel data) are back projected, this can result in the fact that these pixels are associated with more than one volume data cell 16 as the already-described lack of depth information results in an ambiguous mapping (X,Y,Z→U,V→X',Y',Z', where Z' is not unambiguous). Therefore, several volume data cells 16 can receive the sensor data 21 of such 2-dimensional pixels. Due to this ambiguity, this type of mapping can be complex.

But this principle can also be described the other way round, namely from the perspective of the volume data cells 16, by regarding the sensors 11 from the perspective of this volumetric representation: from a given volume data cell 16 a look-up is performed in order to determine where this volume data cell 16 gets its sensor data 21 from. In other words, a mapping of the respective volume data cell 16 X',Y',Z' into the sensor coordinate system U,V of the respective sensor 11 is performed, i.e. from the 3-dimensional internal coordinate system of the volumetric representation to, e.g. 2-dimensional coordinates of an image sensor coordinate system of a camera or to a sensor coordinate system in general. The difference is, that the sensor data 21 are transferred in the opposite direction from the respective sensor 11 to the volume data cell 16. These transfer functions 23 with inverse transfer direction (from sensor to volume data cell) are called inverse transfer functions or inverse mapping functions 24 (i.e. looking at the respective volume data cell 16 into the internal volumetric coordinate system 18 and transferring the sensor data from the sensor coordinate system to the internal volumetric coordinate system 18 of the volume data cells 16).

This mapping of sensor data 21 of all the sensors 11 results in combined data 25 for each volume data cell 16, i.e. a collection of sensor data 21 from different sensors 11. In other words, combined data 25 can be determined that describe what possible object 19, 20 could have been present in the corresponding volume element 15 of the environment 14. Overall, for obtaining the combined data 25 for the respective volume data cell 16, a look-up is performed from the volume data cells 16 of 3D volumetric representation (central representation as provided by the definition of the volume data cells 16) into the sensor coordinate systems of all the sensors 11.

As combined data 25 from different sensors 11 are combined or stored together in each volume data cell 16, the information from different sensors 11 are fused and can be analyzed together in the respective volume data cell 16.

By applying a respective artificial neural network ANN to the combined data 25 of one respective volume data cell 16 makes is possible to perform an object detection/recognition for the corresponding volume element 15 on the basis of the sensor data 21 of several different sensors 11 collected as the combined data 25 in the corresponding volume data cell 16. Thus the sensor data 21 of each sensor 11 may contribute to the ANN-based object detection and/or recognition. Note that a volume data cell 16 preferably stores the sensor data 21 of more than only one single sensor pixel or sensor voxel. Instead, a whole region of several neighboring sensor pixels or sensor voxels is considered in each volume data cell 16 in order to be able to perform, e.g., an edge detection and/or an object classification on the basis of the combined data 25 of a single volume data cell 16.

Using inverse mapping functions 24 links the volume data cells 16 to the sensors 11 in a way that may also provide the benefit that the training of the respective ANN may also include a training of the inverse mapping functions 24 (if these inverse mapping functions 24 are provided as a part of the ANN that analyzes the combined data 25). If the inverse mapping function 24 or look-up of each volume data cell 16 into the coordinate system of the sensors 11 is modelled as a differentiable function, such an inverse mapping function 24 can be adapted by the training procedure for the ANN. Especially, a back propagation algorithm for training the neural network may back-propagate the error gradient from an output (detection/recognition result) to an input (according to the so-called chain rule), wherein this input can be the sensors themselves, if the inverse mapping functions 24 are included in the training process.

Additionally or alternatively, for providing the inverse mapping functions 24, a model of the respective sensor (e.g. camera) and the information where it is pointing to may be provided. For example, a parametric mapping function may be configured on the basis of these information.

Figure 2:
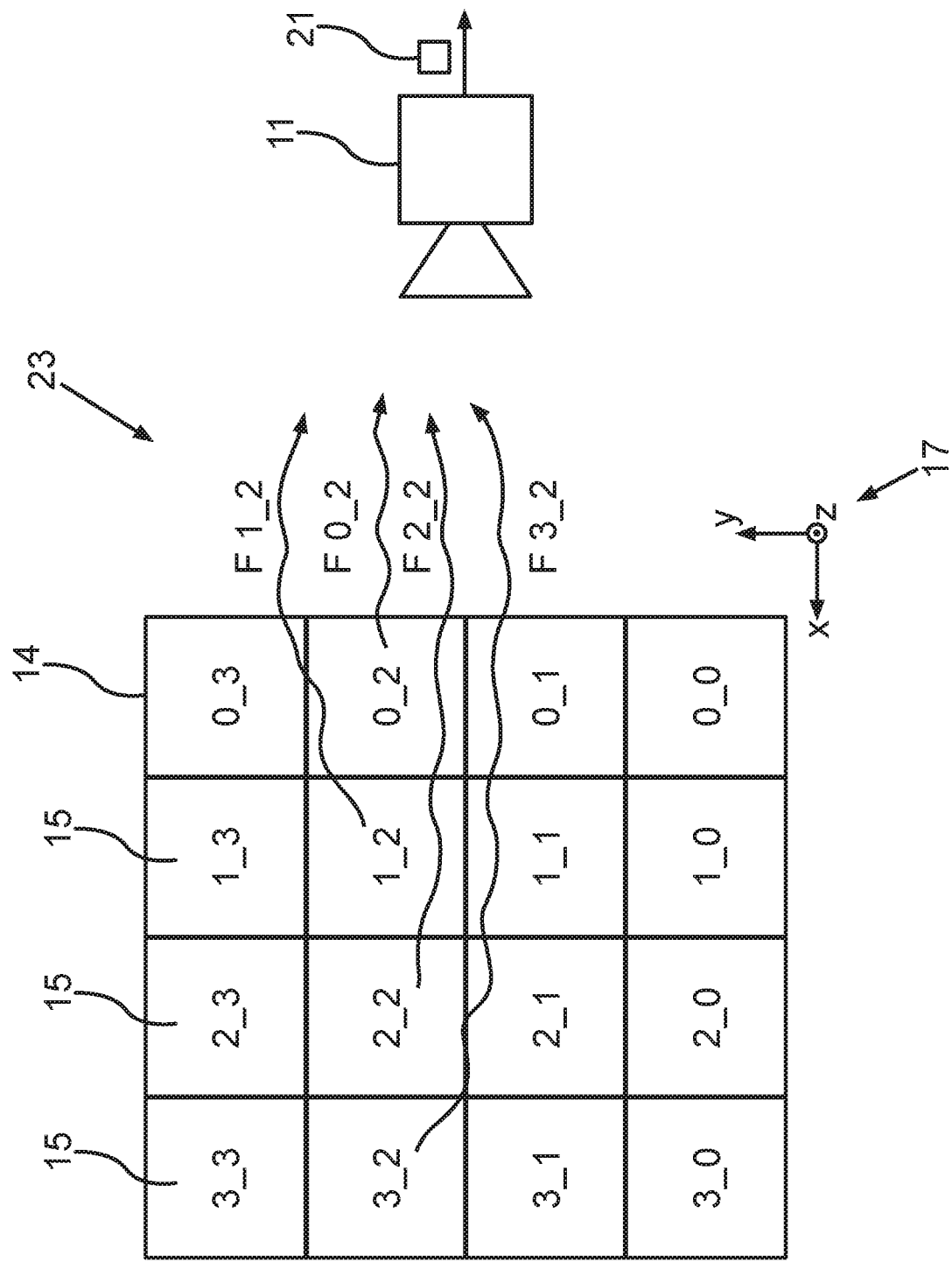
FIG. 2 is a sketch for illustrating an ambiguous mapping.
Figure 3:
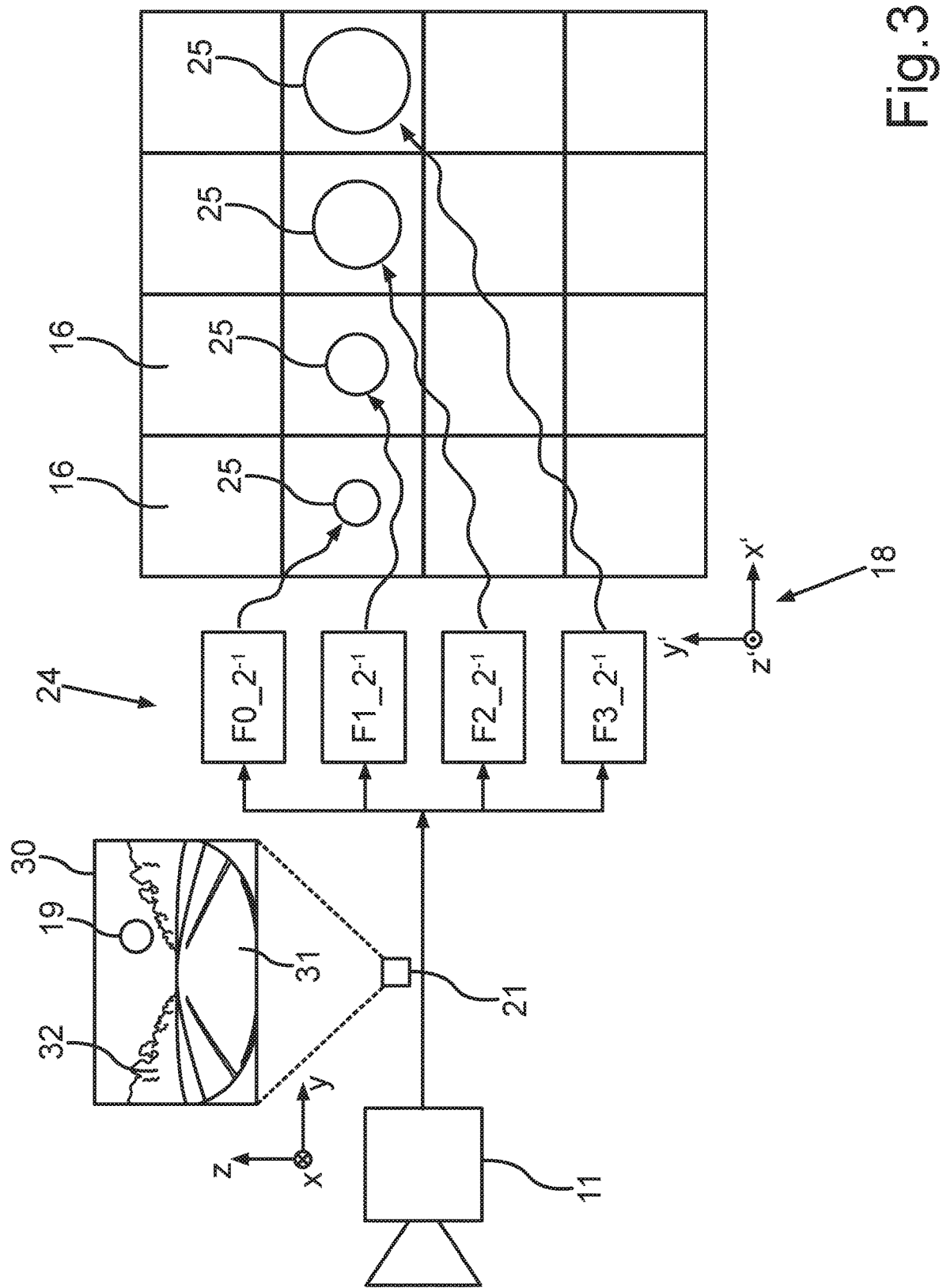
FIG. 3 is a sketch for illustrating resulting inverse mapping functions for several volume data cells.

FIG. 2 and FIG. 3 further illustrate in which way sensor data 21 are ambiguous such that from the sensor data 21 of one single sensor 11 alone, the presence of objects 19, 20 can only be estimated with limited spatial resolution. This ambiguity results from the described sensors with less dimensions than the volumetric representation. Examples are a radar sensor and an ultrasonic sensor (both provide no height information) and an image sensor (no depth/distance information provided). Such an estimation in the form of combined data 25 leads to information about "possible objects" in contrast to the real objects 19, 20, as the exact position (exact volume element 15) cannot be derived.

FIG. 2 introduces a scheme for labelling volume elements 15 of environment 14. Each volume element 15 is represented by a pair of coordinates indicating the column C and row R (height is ignored in FIG. 2 as a top view perspective is shown like in FIG. 1). A volume element 15 can be represented by its column-row coordinate C_R, for example, 3_2 for C=3 and R=2. Correspondingly, a mapping functions 23 of name F can be labelled on the basis of the coordinates as FC_R, for example, F3_2 indicating mapping function F starting at volume element C_R (and leading to one specific sensor 11). FIG. 2 illustrates the mapping functions 23 of row number 2, i.e. the mapping functions F0_2 up to F3_2.

If a sensor 11 has no sensitivity for depth (i.e. the distance between sensor 11 and respective volume element 15 is not measured), such a sensor 11 can only create sensor data 21 that do not describe how far the respective volume element 15 or more precisely an object contained in one of the volume elements 15 of the same row R is away from the sensor 11. An example of such a sensor 11 is an image sensor of a camera. In other words, the information about the column C is not represented in the sensor data 21.

FIG. 3 illustrates the consequence with regard to applying inverse mapping functions 24 to sensor data 21 of such a sensor 11 that has no depth sensitivity. As an example, sensor data 21 may represent a camera image 30 showing a Street 31, a tree 32 and the object 19 (see FIG. 1). From the sensor data 21 containing camera image 30, it cannot be seen, how far the object 19 is away from sensor 11. Consequently, when inverse mapping functions 24 are applied to the sensor data 21, combined data 25 result for each column C' in the volume data cells 16. Column C' is the column in the internal volumetric coordinate system 18 describing the column C in the environment 14 (see FIG. 1).

Applying the inverse mapping functions 24 to the sensor data 21 reveals the ambiguity as regards depth information. However, the inverse mapping functions 24 generate combined data 25 that indicate that if an object 19 is very close to sensor 11 (left column), the object 19 must be smaller than in the case that the object 19 is far away from sensor 11 (right column). The combined data 25 would be different as regards the size of the possible object 19.

Using only the combined data 25 of one single sensor for performing an object detection/recognition on the basis of an artificial neural network might therefore deteriorate the detection/recognition performance as the size of an object 19 can be a valuable hint for the artificial neural network.

Figure 4:
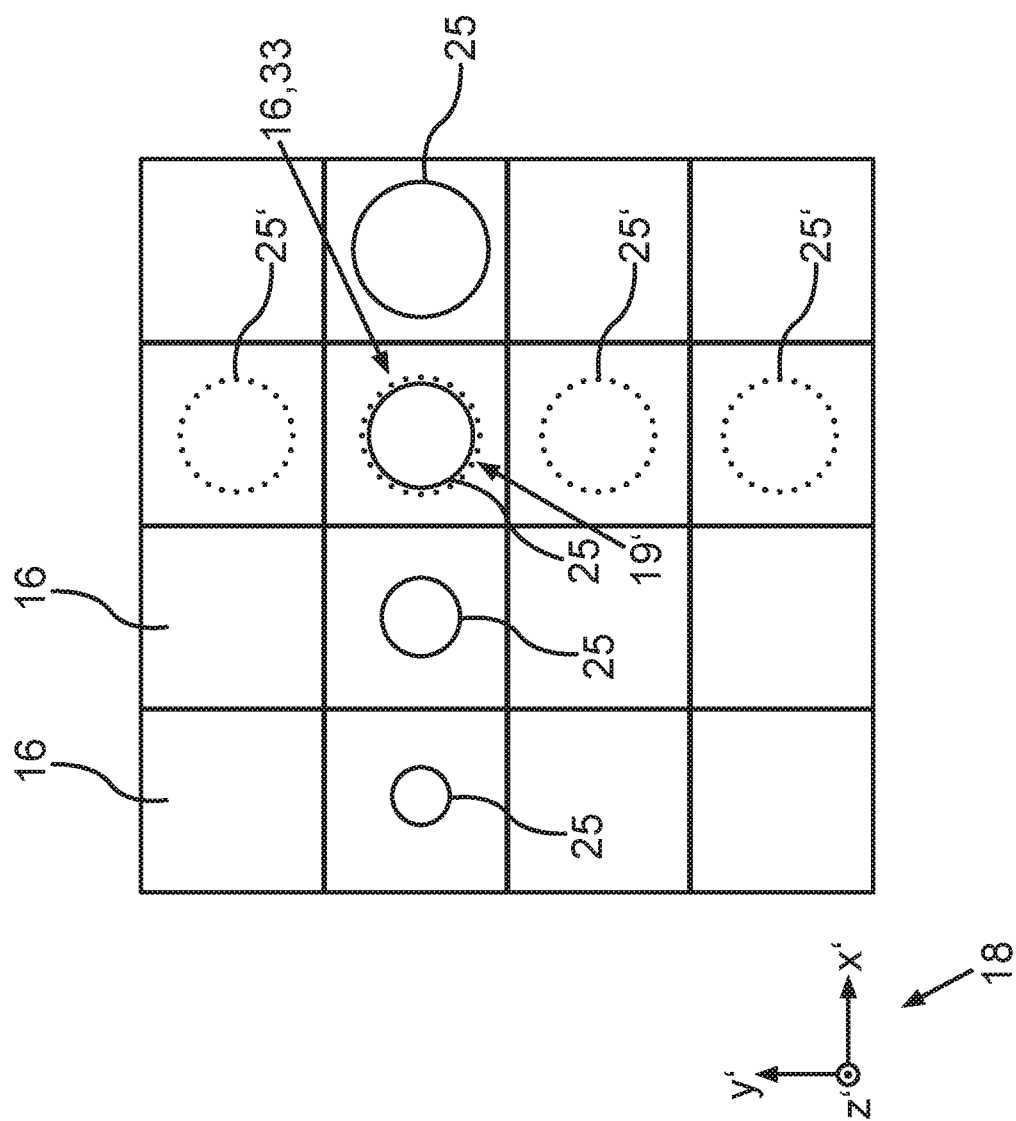
FIG. 4 is a sketch for illustrating the resulting sensor data fusion.

FIG. 4 illustrates how the detection/recognition performance can be improved, if combined data 25, 25' of different sensors 11 are combined in the volume data cells 16. FIG. 4 illustrates the possible content of volume data cells 16 for object 19 (see FIG. 3): the combined data 25 of a sensor 11 with low depth sensitivity, like an image sensor, and the combined data 25' of a second sensor 11 with higher depth resolution, but lower angular resolution (resulting in ambiguous information regarding the row R (i.e. Y'-coordinate)) can be combined. An example for a sensor with low angular resolution is a radar sensor or an ultrasonic sensor.

Combining the combined data 25, 25' will result in only one volume data cell 33 where the combined data 25, 25' of both sensors 11 indicate the presence of a possible object 19'. All the other volume data cells 16 provide combined data 25, 25' with a weaker or lower indication for a presence of a possible object. Applying an artificial neural network to all the data cells 16, 33, will provide a clearer or more confident detection/recognition result for volume data cell 33 as in this volume data cell 33 the combined data 25, 25' of two sensors describe more features or characteristics of the object 19. The artificial neural network receives more hints indicating the presence and features of the object 19.

Thus, by mapping sensor data 21 of several different sensors 11 using the inverse mapping functions 24, an artificial neural network can be supplied with the combined information from several sensors. There is no need to perform a detection/recognition for each sensor 11 individually and then combine the detection/recognition results afterwards. One single detection/recognition process for each volume data cell 16 is needed only and this detection/recognition process can additionally be based on the combined information from several sensors (i.e. the combined data 25, 25'). If more than two sensors are available, even more contribution data can be generated for each volume data cell 16 making the detection/recognition process even more robust as even more features of the object are described.

Figure 5:
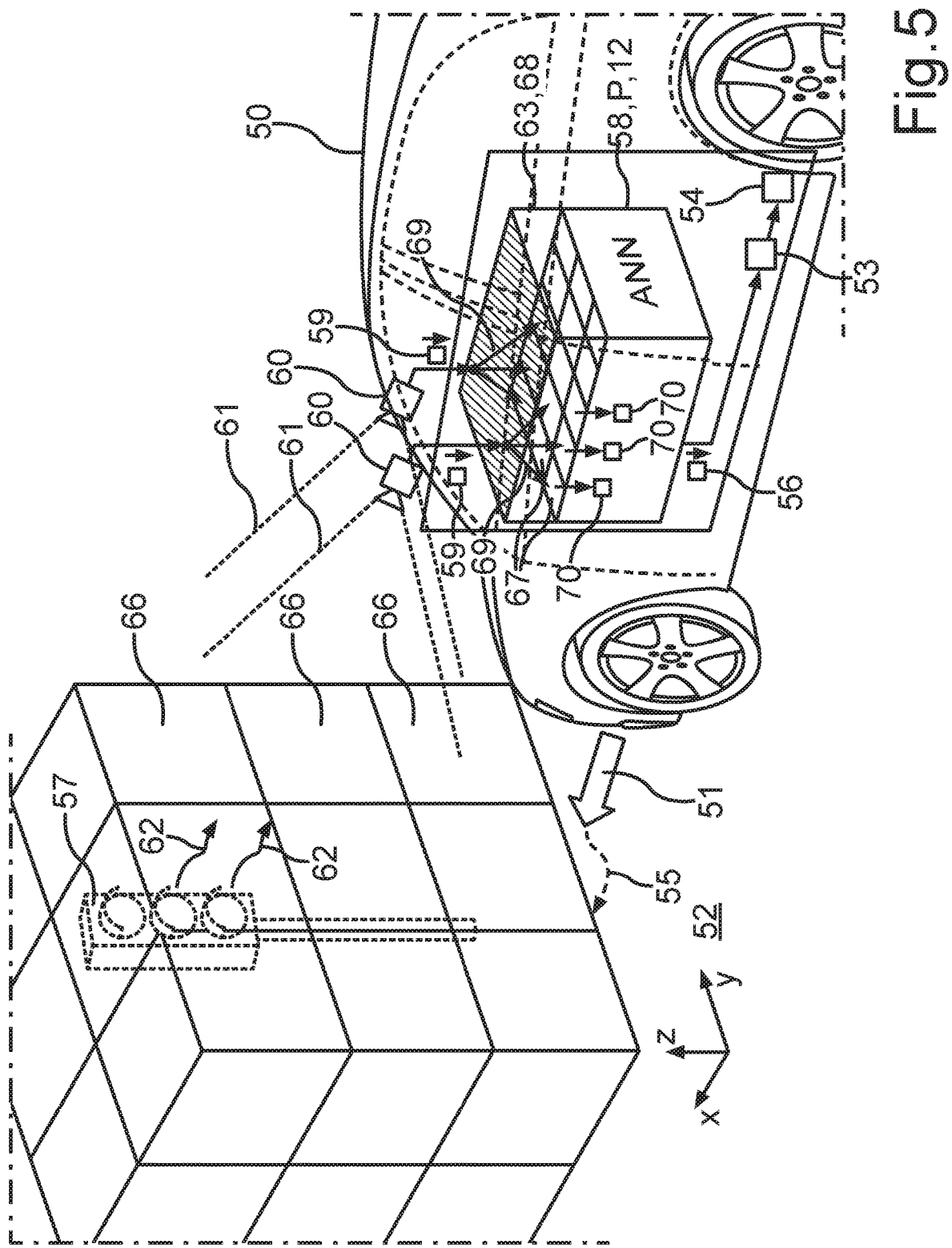
FIG. 5 is a schematic illustration of a vehicle with a processing unit that is performing a method according to the invention.

FIG. 5 shows the motor vehicle 10 that can be designed, for example, as a passenger vehicle or a truck. The motor vehicle 10 may drive or perform a motion 51 through an environment 52, e.g. along a road. A steering and/or an acceleration and/or a braking of the vehicle 10 may be performed autonomously by an electronic control circuit 53 that is providing an autonomous driving function. Like is known from the prior art, the control circuit 53 may control actuators 54 for controlling the steering and/or an engine and/or brakes of the vehicle. For deciding or calculating a trajectory 55 for the motion 51, the control circuit 53 may receive feature data 56 of at least one object 57 in the surroundings or the environment 52 of the vehicle 10. In FIG. 5, as an exemplary object 57 a traffic light is depicted. Other possible objects may be the road, traffic participants (e.g. vehicles, cyclists, pedestrians), buildings, road-side installations. The feature data 56 describing the respective recognized object 57 may be provided by an object recognition 58, which may be based, for example, on an artificial neural network ANN.

The object recognition 58 may receive sensor data 59 from several different sensors 60 of the vehicle 10. Respective detection ranges 61 of the sensors 60 may be directed towards or into the environment 52 such that radiation or signals 62, for example electromagnetic waves and/or sound waves, emitted or reflected by the respective object 57, may be received by the sensors 60. The signals 62 may be transformed into the sensor data 59 or may be used for generating the sensor data 59 in the respective sensor 60. The sensor data 59 may be generated or updated by the sensors 60 periodically, for example at a given frame rate or in periodic measurement cycles, in a range from, e.g. 1000 per second to 1 every 2 minutes. Exemplary sensors can be: camera, radar, ultrasonic, lidar, infrared, just to name examples.

As the sensor data 59 originate from different sensors 60, in the vehicle 10, a sensor data fusion 63 is provided as a pre-processing for the object recognition 58.

The sensor data fusion 63 and the artificial neural networks ANN may be operated or provided in a processing unit 65 of the vehicle 10. To this end, the processing unit 65 may comprise at least one microprocessor and/or at least one data storage.

For the sensor data fusion 63, virtual volume elements 66 may be defined in the environment 52. Each volume element 66 may form the basis or a separate unit for the recognition process in the object recognition 58 in that the sensor data 59 belonging to a respective volume element 66 are provided in combination in a respective volume data cell 67 to the object recognition 58. To achieve this, the sensor data fusion 63 is designed as a preprocessing 68 that provides an inverse transfer function 69 for mapping or associating sensor data 59 depending on their position in the sensor coordinate system of the respective sensor to a respective volume data cell 67 that represents a specific volume element 66.

The sensor data fusion 63 may be designed as an extension or as additional layers of the artificial neural network ANN. For training such an extension of the artificial neural network ANN, sensor training data may be generated, either artificially/numerically or in test drives or in a testing phase, where for a is specific object, the resulting sensor data 59 and the correct volume data cell 67 are known. This can be provided as sensor training data and labeling data for training a separate artificial neural network or said extension for the ANN that is to perform the sensor data fusion 63.

Alternatively, an inverse mapping function 69 may be defined on the basis of an equation or deterministic algorithm describing, for example, the extrinsics and/or the intrinsics of the respective sensor 60. The relation of a volume element 66 to a volume data cell 67 can be expressed by using a coordinate transformation or mapping for transforming the world coordinate system 17 of the environment 52 to the sensor coordinate system of the respective sensor 60. The inverse mapping function 69 describes the inverse process whereby a possible reduction in dimensions from the 3-dimensional world coordinate systems 17 to the, for example, two-dimensional or 2.5-dimensional coordinate system of the respective sensor 60 can be taken into account. The respective inverse mapping function 69 may be expressed on the basis of a vector transform or implicitly by the respective training of the layers of the artificial neural network that performs the sensor data fusion 63.

Thus, in each volume data cell 67, the sensor data 59 of different sensors 60 are combined as combined data 70 that may then be provided together or in combination as an input to the object recognition 58. Thus, the object recognition 58 may be based not only on the sensor data 59 of one single sensor 60 at a time, but the characteristics of an object 57 as reflected by the sensor data 59 of several different sensors 60 (especially of sensor of different sensor types) can be processed together or at the same time or in combination. The object recognition 58 is a processing P that follows the generation of the combined data 70.

Thus, the artificial neural network ANN is provided with data chunks or data blocks of combined data 70 belonging to the respective volume data cell 67. The object recognition of possible objects 57 in the environment 52 can be performed for each volume element 66 separately. In this context, the artificial neural network ANN can also be regarded as several separate artificial neural networks that perform the processing P for the object recognition 58 individually for one separate volume element 66.

The generation of the combined data 70 may also comprise that the output of the inverse mapping function 69, may be further pre-processed using, e.g., a convolution for convolving the output of the different volume data cells 67. This can be performed for sensor data originating from the same sensor and/or from different sensors. Additionally or alternatively, the combined data 70 of neighboring volume data cells 67 may be provided together to the same part of the artificial neural networks ANN that is associated with one specific volume element in order to provide information about the context or the neighborhood of the respective corresponding volume data cell 67.

Over all, the example shows how a data fusion can be provided as a pre-processing for an artificial neural network.

The following reference signs are used in this document:
10 motor vehicle
11 sensor
12 processing unit
13 detection range
14 environment
15 volume element
16 volume data cell
17 world coordinate system
18 internal volumetric coordinate system
19 object
21 sensor data
22 signal
23 mapping
24 inverse mapping function
25 combined data
30 image
31 street
32 tree
33 volume data cell
51 motion
52 environment
53 control circuit
54 actuators
55 trajectory
56 feature data
57 object
58 object recognition
59 sensor data
60 sensor
61 detection range
62 signal In various embodiments, the disclosure above describes a method for operating a processing unit of a vehicle for processing sensor data of several different sensors with an artificial neural network. A respective detection range of each sensor may be directed towards an environment of the vehicle. A set of volume data cells may be provided as a volumetric representation of different volume elements of the environment, wherein for each combination of one of the volume elements and one of the sensors a respective mapping of a world coordinate system of the environment to a respective sensor coordinate system of the respective sensor is given. When sensor data is generated by the sensors, the sensor data may be transferred to the respective volume data cells using an inverse mapping function which provides an inverse to the mapping, such that each inverse mapping function is a mapping of the respective sensor coordinate system to an internal volumetric coordinate system corresponding to the world coordinate system, and by the transfer of the sensor data each volume data cell receives the sensor data that are associated with this volume data cell according to the inverse mapping function of each sensor, wherein the received sensor data from each sensor are accumulated in the respective volume data cell as combined data. For each volume data cell an individual processing of the combined data of that volume data cell is performed by the ANN, wherein the individual processing comprises deriving feature data of at least one feature of at least one object that is described by the combined data such that a combined processing of sensor data of the different sensors originating from the same volumetric element is performed.

In some embodiments, at least a part of the processing of the sensor data may be agnostic in that it is performed independently from which sensor the combined data are from.

In any of the embodiments above, at least for a part of the processing of the sensor data respective tagging data may be provided, wherein the tagging data informs the ANN from which sensor the respective sensor data is coming from.

In any of the embodiments above, the respective ANN of at least one volume data cell also may receive at least a part of the combined data from at least one neighboring volume data cell.

In any of the embodiments above, a mathematical operation that combines spatially proximate values, in particular a 3D-convolution, may be applied to combine at least a part of the sensor data of at least two neighboring volume data cells for generating at least a part of the combined data of these volume data cells.

In any of the embodiments above, in at least one iteration step at least one invariant operator may be applied to the feature data for deriving modified feature data.

In any of the embodiments above, the respective inverse mapping function may model sensor intrinsics and sensor extrinsics of the respective sensor.

In any of the embodiments above, the inverse mapping functions may be implemented as an artificial neural network.

In any of the embodiments above, the volume data cells may be provided by one or more than one layer of the ANN, wherein the ANN comprises both the inverse mapping functions and the individual processing for the volume data cells.

Any embodiments of the method above may be implemented by a processing unit executing program code. In addition, any embodiments of the method above may be implemented by a motor vehicle comprising an electronic control circuit that is designed to operate the vehicle in an autonomous driving mode and comprising several sensors for detecting objects in the environment of the vehicle.

The invention claimed is:

1. A method for operating a processing unit of a vehicle to process sensor data of several different sensors, the method comprising:
by a processing unit of a vehicle having a plurality of sensors that are directed toward an environment of the vehicle, maintaining a set of volume data cells that provide a volumetric representation of different volume elements of the environment, wherein for each combination of one of the volume elements and one of the sensors a respective mapping of a world coordinate system of the environment to a respective sensor coordinate system of the respective sensor is given; and
by the processing unit, when sensor data is generated by the sensors:
transferring the sensor data to the respective volume data cells using an inverse mapping function which provides an inverse to the mapping, such that each inverse mapping function is a mapping of the respective sensor coordinate system to an internal volumetric coordinate system corresponding to the world coordinate system, and by the transfer of the sensor data each volume data cell receives the sensor data that are associated with this volume data cell according to the inverse mapping function of each sensor, wherein the received sensor data from each sensor are accumulated in the respective volume data cell as combined data, and
for each volume data cell, using an artificial neural network ("ANN") to perform an individual processing of the combined data of that volume data cell, wherein the individual processing comprises deriving feature data of at least one feature of at least one object that is described by the combined data such that a combined processing of sensor data of the different sensors originating from the same volumetric element is performed.

2. The method of claim 1, wherein at least a part of the individual processing or combined processing of the sensor data is agnostic in that it is performed independently from which sensor or sensors the sensor data or the combined data are from.

3. The method of claim 1, wherein at least for a part of the individual processing of the sensor data respective tagging data is provided, wherein the tagging data informs the ANN from which sensor the respective sensor data is coming from.

4. The method of claim 1, wherein the ANN also receives at least a part of the combined data from at least one neighboring volume data cell.

5. The method of claim 1, further comprising, by the processing unit, applying a 3D- convolution to combine at least a part of the sensor data of at least two neighboring volume data cells and generate at least a part of the combined data of these volume data cells.

6. The method of claim 1, further comprising, by the processing unit, applying at least one invariant operator to the feature data to derive modified feature data.

7. The method of claim 1, wherein the inverse mapping function models sensor intrinsics and sensor extrinsics of the sensor that generated the sensor data.

8. The method of claim 1, wherein the inverse mapping function is implemented as an artificial neural network.

9. The method of claim 1, wherein:
the volume data cells are provided by one or more than one layer of the ANN, and
the ANN comprises both the inverse mapping function and the individual processing for the volume data cells.

10. A non-transitory memory storing program code that is configured to cause a processing unit of a vehicle to perform a method comprising:
maintaining a set of volume data cells that provide a volumetric representation of different volume elements of the environment, wherein for each combination of one of the volume elements and a respective one of a plurality of sensors of the vehicle a respective mapping of a world coordinate system of the environment to a respective sensor coordinate system of the respective sensor is given; and
in response to receiving sensor data generated by one or more of the sensors of the vehicle:
transferring the sensor data to the respective volume data cells using an inverse mapping function which provides an inverse to the mapping, such that each inverse mapping function is a mapping of the respective sensor coordinate system to an internal volumetric coordinate system corresponding to the world coordinate system, and by the transfer of the sensor data each volume data cell receives the sensor data that are associated with this volume data cell according to the inverse mapping function of each sensor, wherein the received sensor data from each sensor are accumulated in the respective volume data cell as combined data, and
for each volume data cell, using an artificial neural network ("ANN") to perform an individual processing of the combined data of that volume data cell, wherein the individual processing comprises deriving feature data of at least one feature of at least one object that is described by the combined data such that a combined processing of sensor data of the different sensors originating from the same volumetric element is performed.

11. The non-transitory memory of claim 10, wherein program code to perform at least a part of the individual processing or combined processing of the sensor data comprises instructions to do so is an agnostic manner, independently from which sensor or sensors the sensor data or the combined data are from.

12. A system comprising:
an electronic control circuit that is designed to operate a vehicle in an autonomous driving mode;
a plurality of sensors for detecting objects in the environment of the vehicle;
a processing unit; and
a non-transitory memory storing program code that is configured to cause the processing unit to perform a method comprising:
maintaining a set of volume data cells that provide a volumetric representation of different volume elements of the environment, wherein for each combination of one of the volume elements and a respective one of the sensors of the vehicle a respective mapping of a world coordinate system of the environment to a respective sensor coordinate system of the respective sensor is given, and
in response to receiving sensor data generated one or more of the sensors of the vehicle:
transferring the sensor data to the respective volume data cells using an inverse mapping function which provides an inverse to the mapping, such that each inverse mapping function is a mapping of the respective sensor coordinate system to an internal volumetric coordinate system corresponding to the world coordinate system, and by the transfer of the sensor data each volume data cell receives the sensor data that are associated with this volume data cell according to the inverse mapping function of each sensor, wherein the received sensor data from each sensor are accumulated in the respective volume data cell as combined data, and
for each volume data cell, using an artificial neural network ("ANN") to perform an individual processing of the combined data of that volume data cell, wherein the individual processing comprises deriving feature data of at least one feature of at least one object that is described by the combined data such that a combined processing of sensor data of the different sensors originating from the same volumetric element is performed.

13. The system of claim 12, wherein at least a part of the individual processing or combined processing of the sensor data is agnostic in that it is performed independently from which sensor or sensors the sensor data or the combined data are from.

14. The system of claim 12, wherein the program code further comprises, for at least a part of the individual processing of the sensor data, instructions to provide respective tagging data, wherein the tagging data informs the ANN from which sensor the respective sensor data is coming from.

15. The system of claim 11, wherein the program code further comprises instructions to also provide the ANN with at least a part of the combined data from at least one neighboring volume data cell.

16. The system of claim 12, wherein the program code further comprises instructions to apply a 3D-convolution to combine at least a part of the sensor data of at least two neighboring volume data cells and generate at least a part of the combined data of these volume data cells.

17. The system of claim 12, wherein the program code further comprises instructions to apply at least one invariant operator to the feature data to derive modified feature data.

18. The system of claim 12, wherein the program code to use the inverse mapping function comprises instructions to model sensor intrinsics and sensor extrinsics of the sensor that generated the sensor data.

19. The system of claim 12, wherein the program code to use the inverse mapping functions comprises instructions to implement the inverse mapping function as an artificial neural network.

20. The system of claim 12, wherein:
the volume data cells are provided by one or more than one layer of the ANN, and
the ANN comprises both the inverse mapping function and the individual processing for the volume data cells.

* * * * *